United States Patent
Morisaki (10) Patent No.: US 6,388,761 B1
(45) Date of Patent: *May 14, 2002

(54) MULTI-FUNCTION PERIPHERAL DEVICE

(75) Inventor: Hiroshi Morisaki, Aichi-ken (JP)

(73) Assignee: Brother Kogyo Kabushiki Kaisha, Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,256

(22) Filed: Aug. 25, 1997

(30) Foreign Application Priority Data

Aug. 26, 1996 (JP) .............................................. 8-223381

(51) Int. Cl.[7] .............................................. G06K 15/00
(52) U.S. Cl. .................................... 358/1.15; 358/1.13
(58) Field of Search ................................. 358/442, 468, 358/404, 444, 1.1, 1.15, 1.16, 1.17, 1.18, 1.14, 1.13, 1.6, 1.5, 434, 435, 436, 437, 438, 439, 412; 709/233; 710/60, 61, 29, 52, 53, 54, 55–74

(56) References Cited

U.S. PATENT DOCUMENTS

| | | | | |
|---|---|---|---|---|
| 4,080,632 A | * | 3/1978 | Crane | 358/275 |
| 4,947,345 A | * | 8/1990 | Paradise et al. | 358/442 |
| 4,991,200 A | * | 2/1991 | Lin | 358/442 |
| 5,208,676 A | * | 5/1993 | Inui | 358/296 |
| 5,377,016 A | * | 12/1994 | Kashiwagi et al. | 358/403 |
| 5,579,452 A | * | 11/1996 | Ambalavanar et al. | 358/1.16 |
| 5,729,573 A | * | 3/1998 | Bailey et al. | 375/222 |
| 5,748,337 A | * | 5/1998 | Minamizawa | 358/468 |
| 5,778,163 A | * | 7/1998 | Terajima | 358/442 |
| 5,790,279 A | * | 8/1998 | Sakellaropoulos | 358/442 |
| 5,790,640 A | * | 8/1998 | Tassa et al. | 358/442 |
| 5,809,278 A | * | 9/1998 | Watanabe et al. | 395/477 |
| 5,815,280 A | * | 9/1998 | Ohmura et al. | 358/296 |

* cited by examiner

Primary Examiner—Dov Popovici
Assistant Examiner—King Y. Poon
(74) Attorney, Agent, or Firm—Oliff & Berridge, PLC (57) ABSTRACT

A multi-function peripheral device serves as a peripheral device for an information processing unit and is capable of simultaneously executing a plurality functions by multi-task processing. The multi-function peripheral device includes: a transmission/reception unit that transmits and receives data, for performing a plurality of functions, between the multi-function peripheral device and the information processing device; a transmission unit that transmits and receives data to and from a remote transmission device via a transmission line; and a reception speed control unit that, when the transmission unit and the transmission/reception unit operate simultaneously, reduces reception speed at which the transmission/reception unit receives data from the information processing device.

35 Claims, 4 Drawing Sheets

MULTI-FUNCTION PERIPHERAL DEVICE

BACKGROUND OF THE INVENTION

1. Field of the Invention

The present invention prelates to a multi-function peripheral device serving as a peripheral device of an information processing device and including a plurality of functions such as a scanner function, the multi-function peripheral device being capable of simultaneously executing the plurality of functions using multi-task processing. The present invention further relates to a recording medium storing a program for operating this multi-function peripheral device.

2. Description of the Related Art

Recently, development of multi-function peripheral devices has been proceeding at a startling rate. Such multi-function peripheral devices can serve as a peripheral device of an information processing device such as a personal computer. The multi-function peripheral devices include a plurality of functions such as a scanner function. The multi-function peripheral devices are capable of simultaneously executing the plurality of functions by using multi-task processing.

One such multi-function peripheral device includes a transmission/reception unit, such as an interface and a cable, for enabling transmission and reception of a variety of data, such as print data, scanner data, facsimile reception data, and facsimile transmission data, between the multi-function peripheral device and an information processing device, such as a personal computer. In this way the transmission/reception unit enables various functions of the multi-function peripheral device.

The transmission/reception unit has a buffer memory for temporarily storing a predetermined amount of data, such as one byte of data, from the information processing device. When the predetermined amount of data has been stored in the buffer memory, the transmission/reception unit transmits a signal for prohibiting the information processing device from transmission any further data. Also, the CPU of the multi-function peripheral device starts an interrupt routine to process the data received from the information processing device. Accordingly, the CPU of the multi-function peripheral device processes the data temporarily stored in the buffer memory and then immediately processes new data once it is transmitted from the information processing device and temporarily stored in the buffer memory.

SUMMARY OF THE INVENTION

However, the conventional multi-function peripheral device described above immediately processes data once data is received from the information processing device. Therefore, when the information processing device has an extrememly high processing capacity, and so transmits a great deal of data to the multi-function peripheral device in a short time, a great deal of the multi-function peripheral device's capacity will be required to process data from the information processing device.

The multi-function peripheral device can also be provided with a transmission unit, such as a modem, for performing transmission or reception of data over a transmission line, such as a telephone line. When the transmission unit is transmitting or receiving while the transmission/reception unit receives data from the information processing device, then the CPU of the multi-function peripheral device can only allot an extremely short amount of processing time to process data transmitted or received via the transmission/reception unit, thereby causing problems in the transmission function.

For example, when the CPU of the information processing device has a higher capacity than the CPU of the multi-function peripheral device, then when a print task and a facsimile task are simultaneously performed, there is a possibility that the CPU of the information processing device will transmit print data to the multi-function peripheral device at a faster speed than the CPU of the multi-function peripheral device can process both the facsimile data and the print data. In this case, each time the CPU of the multi-function peripheral device transmits print data from the buffer memory of the transmission/reception unit, then new print data is immediately received from the information processing device and temporarily stored in the buffer memory of the transmission/reception unit. As a result, the CPU of the multi-function peripheral device will be constantly processing print data so that very little time is left for processing facsimile data. Proper processes become impossible to perform. Because the transmitting speed of the transmission unit can absolutely not be changed once set, if the CPU takes too much time to process data transmitted or received via the transmission/reception unit, then an error can result with the transmission function of the multi-function peripheral device. For example, transmission of response commands to a remote facsimile, transmission of facsimile data, or reception of facsimile data can require more than an allowable predetermined duration of time, so that a transmission error is generated in the multi-function peripheral device.

It is an objective of the present invention to overcome the above-described problems and to provide a multi-function peripheral device capable of performing continuous transmission of data over a transmission line without transmission of data being stopped because the CPU is presently processing data received from an information processing device.

A multi-function peripheral device according to the present invention serves as a peripheral device for an information processing unit and is capable of simultaneously executing a plurality functions by multi-task processing. In order to achieve the above-described objectives, the multi-function peripheral device according to the present invention includes: a transmission/reception unit that transmits and receives data, for performing a plurality of functions, between the multi-function peripheral device and the information processing device; a transmission unit that transmits and receives data to and from a remote transmission device via a transmission line; and a reception speed control unit that, when the transmission unit and the transmission/reception unit operate simultaneously, reduces reception speed at which the transmission/reception unit receives data from the information processing device.

With this configuration, the transmission/reception unit lowers the reception speed of data from the information processing device when the transmission unit and the transmission/reception unit are operated simultaneously. Therefore, a certain amount of time for processing data transmitted or received via the transmission unit will be secured so that transmission and reception of data over the transmission line can be smoothly continued without being stopped because data received from the information processing device is being processed. For example, when print data is being received from the information processing device simultaneously with transmission or reception of facsimile data over the transmission line, then the reception speed at which the print data is being received from the information processing device is lowered. Therefore, even if the information processing device has an extremely high processing capacity, both the print data and the facsimile data can be properly processed without transmission of the response commands through a remote device over the transmission circuit or without reception of the facsimile data exceeding an allowable predetermined duration of time. Therefore, no transmission errors will be generated.

The present invention can be applied to the multi-function peripheral device connected to a variety of different types of information processing device such as personal computers and workstations.

The plurality of functions including the scanner function can also include a printer function, a personal computer facsimile function, a copy function, and a facsimile function, although these are only possible examples. The personal computer facsimile function enables the multi-functional peripheral device to modulate image data from an information processing device and transmit the modulated image data over a transmission line, such as a telephone line. The personal computer facsimile function also enables the multi-function peripheral device to demodulate image data inputted over the transmission line and to supply the demodulated image data to the information processing device.

The transmission/reception unit can be a cable and an interface or some other types of transmission/reception unit such as a device for transmitting and receiving data using a wireless system.

An example of the transmission line is a telephone line. The telephone line can be a public telephone line or a dedicated line. The transmission line can be a line using actual cables and lines or can be a wireless system.

An example of a transmission unit is a facsimile machine, but could also be a personal computer capable of data transmission.

An example of a transmission speed control unit includes operations of the CPU based on a predetermined program.

According to another aspect of the present invention, the multi-function peripheral device further includes a transmission prohibition unit that prohibits the information processing device from transmitting data to the transmission/reception unit when the transmission/reception unit receives a predetermined amount of data from the information processing device. In this case, the reception speed control unit controls the transmission prohibition unit to prohibit the information processing device from transmitting data to the transmission/reception unit for a duration of time that is longer when the transmission unit and the transmission/reception unit operate simultaneously than when the transmission/reception unit do not operate simultaneously.

With this configuration, the transmission/reception unit lowers the reception speed of data from the information processing device by increasing duration of time at which reception of data is prohibited. In this way, the reception speed can be easily reduced.

In other words, reception of data from the information processing device is not only prohibited when data from the information processing device is temporarily stored in the buffer memory of the transmission/reception unit, but also prohibited for a predetermined duration of time after data is transmitted from the buffer memory so that the buffer memory is empty. Therefore, the multi-function peripheral device can process data from the information processing device during the prohibition period along with processing of data transmitted or received via the transmission unit.

The reception prohibition period is the period of time wherein both data from the information processing device and data received or transmitted via the transmission unit can be processed. It should be noted that when only the transmission/reception unit is operating, it is desirable that the reception prohibition period be set to as short a time period as possible so that the information processing device can be processed as quickly as possible.

According to another aspect of the present invention, the reception speed control unit controls the transmission prohibition unit to set the duration of time according to a transmission speed of the transmission unit.

With this configuration, reception speed of data from the transmission/reception unit is reduced in accordance with the transmission speed of the transmission unit while both the transmission unit and the transmission/reception unit are being operated simultaneously. Therefore, by setting the reception speed of data by the transmission/reception unit to a speed appropriate for transmission speed of the transmission unit, the reduction in reception speed can be kept to a minimum so that data from the information processing device can be efficiently processed.

According to another aspect of the present invention, a storage medium stores programs for controlling a multi-function peripheral device serving as a peripheral device for an information processing unit and capable of simultaneously executing a plurality functions by multi-task processing. In this case, the storage medium stores: a transmission/reception program that controls a transmission/reception unit to transmit and receive data, for performing a plurality of functions, between the multi-function peripheral device and the information processing device; a transmission program that controls a transmission unit to transmit and receive data to and from a remote transmission device via a transmission line; and a reception speed control program that, when the transmission unit and the transmission/reception unit operate simultaneously, controls to reduce reception speed at which the transmission/reception unit receives data from the information processing device.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A multi-function peripheral device according to a preferred embodiment of the present invention will be described while referring to the accompanying drawings wherein like parts and components are designated by the same reference numerals to avoid duplicating description.

Figure 1:
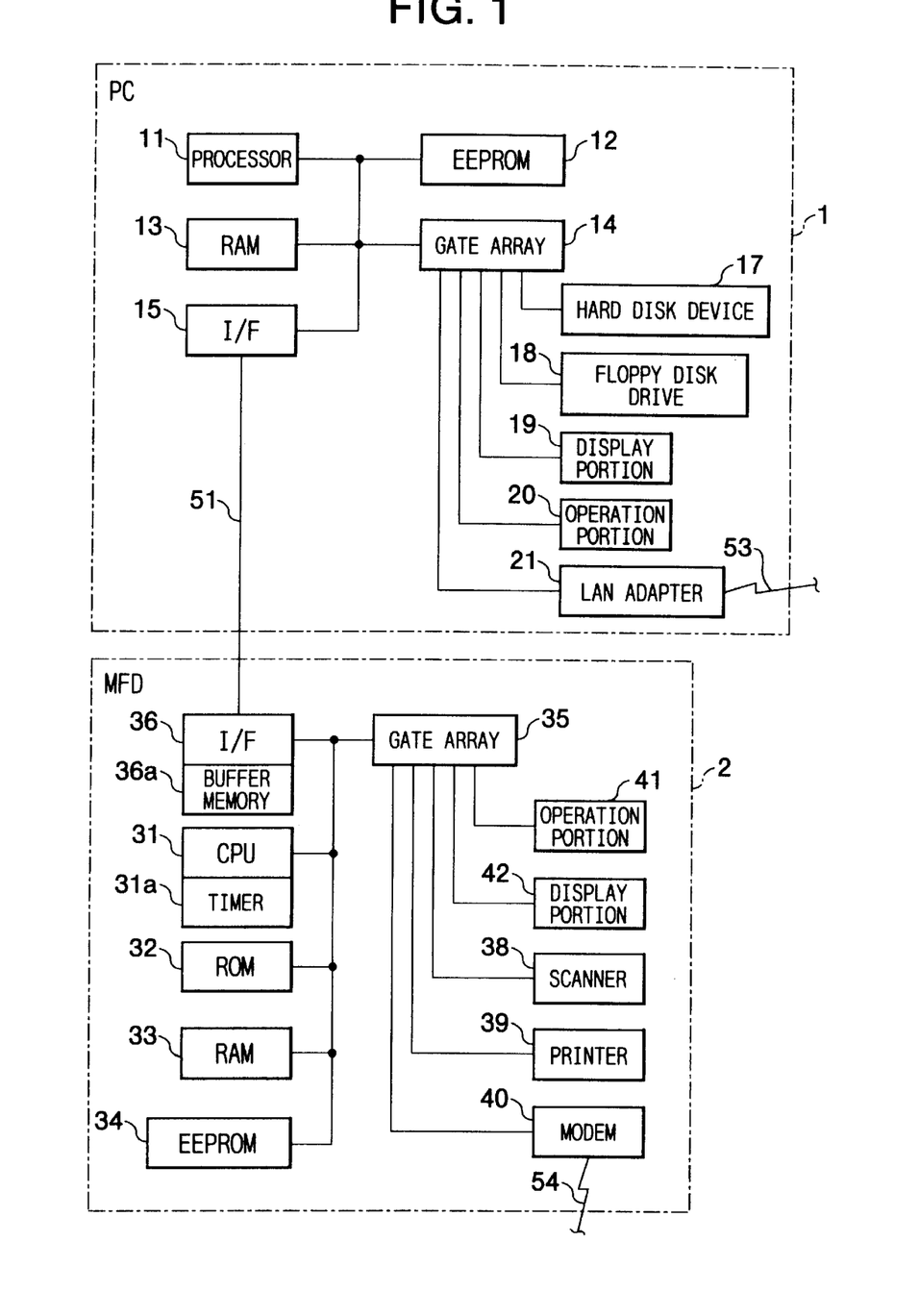
FIG. 1 is a block diagram showing electrical configuration of a personal computer and a multi-function peripheral device according to an embodiment of the present invention while the personal computer is connected to the multi-function peripheral device.

In the present embodiment, the interface 36 and the cable 51 of the multi-function peripheral device 2 serve as a transmission/reception unit for performing transmission and reception of data, for performing a plurality of functions, between the multi-function peripheral device 2 and the personal computer 1. The modem 40 of the multi-function peripheral device 2 serves as a transmission unit for performing transmission and reception of data between the multi-function peripheral device 2 and a remote transmission device over the telephone circuit 54. Also, the CPU 31 of the multi-function peripheral device 2 serves as a reception speed control unit for lowering reception speed of data via the transmission/reception unit when both the transmission unit and the transmission/reception unit are operated simultaneously.

Further, the ROM 32 of the multi-function peripheral device 2 stores programs including a reception speed control program for lowering reception speed of data via the interface 36 and the cable 51 when the interface 36 and the cable 51 and the modem 40 are operated simultaneously.

The CPU 31 of the multi-function peripheral device 2 uses multi-task processing to simultaneously execute the printer task and the facsimile task. Although both the printer operations and facsimile reception operations require the printer 39, the data received during an incoming facsimile transmission can be stored in the RAM 33 or in a reception memory. In this case, the printer task and the facsimile task can be simultaneously executed using multi-task processing.

The personal computer 1 transmits data prepared in the personal computer 1 or personal computer facsimile reception data stored in the hard disk device 17 of the personal computer 1 as print data to the multi-function peripheral device 2 over the cable 51. The multi-function peripheral device 2 prints out the print data using the printer 39. The personal computer 1 transmits the print data to the multi-function peripheral device 2 in single byte units. Each single byte unit is temporarily stored in a buffer memory 36a of the interface 36 of the multi-function peripheral device 2. The print data is then transmitted to the RAM 33, whereupon the CPU 31 executes predetermined processes. Once a single page of print data is accumulated in the RAM 33, then the print data is transmitted to the printer 39.

When a facsimile message is to be transmitted, first the image of the document to be transmitted is retrieved by the scanner 38. The resultant image signal from the scanner 38 is converted into image data by the gate array 35. The gate array 35 sends the image data to the RAM 33, where the CPU 31 converts the image data into facsimile data. The facsimile data is transmitted to the modem 40 via the gate array 35. The modem 40 modulates the facsimile data and transmits it over the telephone circuit 54.

When an incoming facsimile message is received, then facsimile data inputted over the telephone circuit 54 is demodulated by the modem 40 and transmitted to the RAM 33 via the gate array 35. The CPU 31 then converts the demodulated facsimile data into image data. When a single page's worth of image data accumulates in the RAM 33, then the image data is transmitted to the printer 39 via the gate array 35.

For the following explanation, it will be assumed that printer operations and facsimile transmission operations are being simultaneously performed. When the multi-function peripheral device 2 receives a single byte of print data from the personal computer 1, it temporarily stores the data in the buffer memory 36a of the interface 36. Then, a print data interrupt routine for processing the print data is started in the CPU 31 of the multi-function peripheral device 2. Also, the interface 36 of the multi-function peripheral device 2 transmits a reception prohibition signal over the cable 51 to the interface 15 of the personal computer 1. The reception prohibition signal prohibits the interface 15 of the personal computer 1 from transmitting any new print data to the interface 36 of the multi-function peripheral device 2. In other words, while the reception prohibition signal is being outputted from the interface 36, the personal computer 1 will not transmit any new print data to the multi-function peripheral device 2. When the CPU 31 of the multi-function peripheral device 2 transmits the single byte of print data temporarily stored in the buffer memory 36a to the RAM 33, then the buffer memory 36a of the interface 36 is cleared in order to process further print data transmitted from the personal computer 1 as result of the print data interruption routine. Conventionally, the interface 36 of the multi-function peripheral device 2 would stop sending the reception prohibition signal to the personal computer 1 once the buffer memory 36a of the interface 36 is cleared. However, because print operations and facsimile transmission operations are being simultaneously executed, the multi-function peripheral device 2 according to the present invention continues to transmit the reception prohibition signal for a predetermined duration of time after the buffer memory 36a is cleared so that the CPU 31 will have sufficient time to process the transmission data.

Accordingly, until the predetermined duration of time elapses and transmission of the reception prohibition signal is stopped, the personal computer 1 will not input a subsequent single byte of print data to the interface 36. As a result, the CPU 31 can perform both print data processes and facsimile data processes without these two processes interfering with each other. Moreover, facsimile transmission will not be prematurely terminated in an untimely manner. The same is true for facsimile reception is simultaneously performed with print.

The predetermined duration of time for determining how long the reception prohibition signal continues to be transmitted can be changed according to the speed at which the modem 40 can transmit data over the telephone circuit 54. The transmission speed of facsimile transmission changes according to circuit condition of the telephone line and the capacity of both the caller facsimile device and the receiver facsimile device. When transmission is performed at a high speed, the CPU 31 will need to devote more time to processing the facsimile data in order to keep up with the large amount of data to be transmitted or that has been received by the modem 40. Therefore, the predetermined duration of time for prohibiting reception of new print data will need to be increased so that the CPU 31 devotes less time to processing print data from the personal computer 1. On the other hand, when the transmission speed is slow, then the predetermined duration of time for prohibiting reception of new print data can be shortened. Accordingly, print data can be processed at the maximum speed which does not interfere with processing of facsimile transmission.

Figure 2:
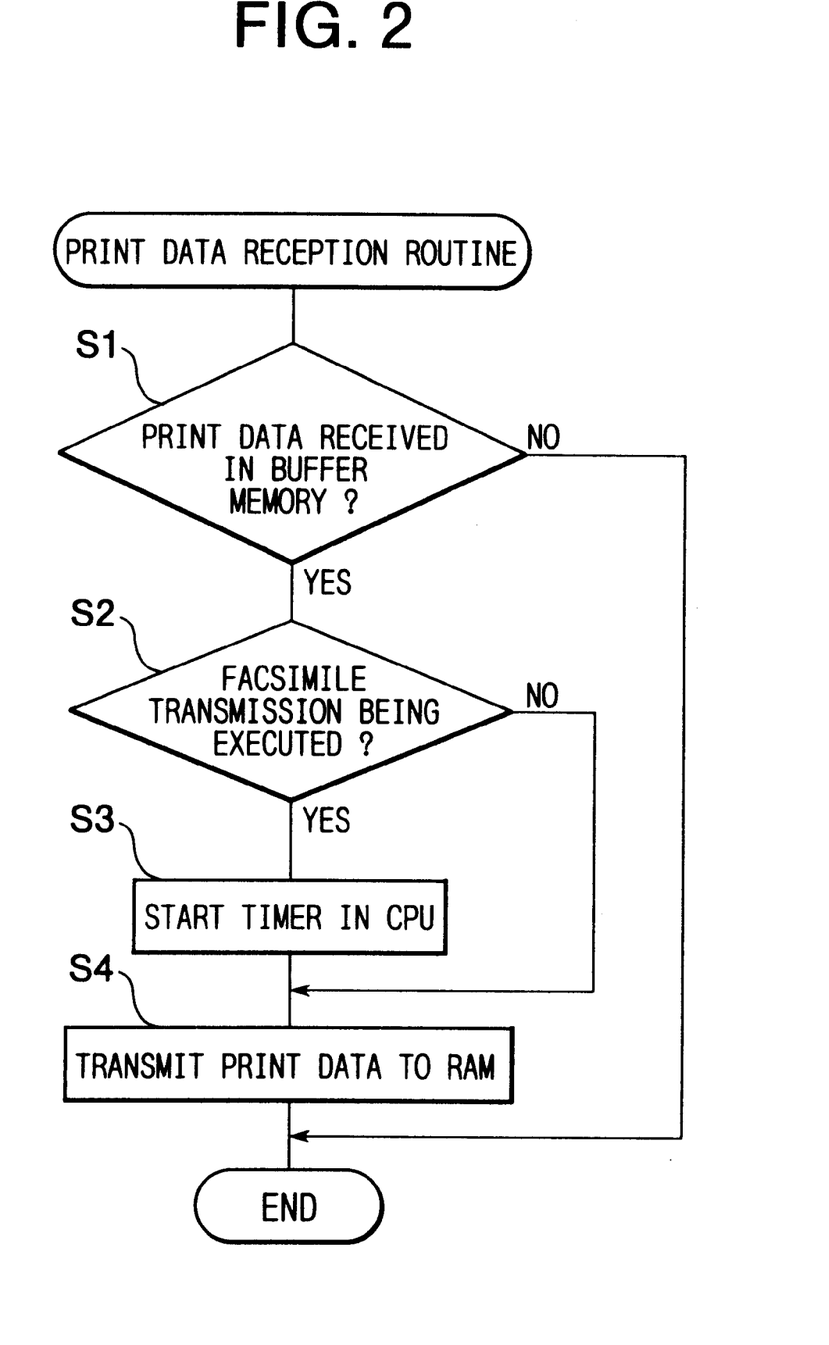
FIG. 2 is a flowchart representing a print data reception routine performed by the multi-function peripheral device of FIG. 1.

Next, while referring to the flowchart shown in FIG. 2, an explanation will be provided for processes performed to receive print data from the personal computer 1 in the manner described above. The print data reception processes are executed each time an interrupt routine is generated when print data is temporarily stored in the buffer memory 36a of the interface 36. First is S1, the CPU 31 of the multi-function peripheral device 2 determines whether or not the received data is print data. In other words, in S1, the CPU 31 investigates whether or not one byte of data temporarily stored in the buffer memory 36a of the interface 36 is print data. In the present embodiment, because each series of print data has a start command at its front end and a stop command at its rear end for indicating the start and end of the print data, the CPU 31 can determine whether or not the received data is print data by turning a flag on and off according to the start and stop commands, and then determining whether the flag is on or off.

When the CPU 31 determines that the received data is print data (S1:YES), then the CPU 31 determines in S2 whether or not a facsimile transmission is being performed. In this case, the CPU 31 investigates whether or not facsimile data is being transmitted or received over the telephone circuit 54.

When a facsimile transmission is being performed (S2:YES), then a routine for outputting a reception prohibition signal is performed in S3. Next in S4, one byte of print data temporarily stored in the buffer memory 36a of the interface 36 is transmitted to the RAM 33 and this routine is ended.

On the other hand, if no facsimile is being simultaneously performed (S2:NO), then there is no need to extend the transmission period of the reception prohibition signal. Therefore, the routine proceeds directly to S4 without performing the routine of S3.

Also, when the received data is not print data (S1:NO), then there is no need to transmit print data to the RAM, let alone output the reception prohibition signal, so the routine is immediately ended.

Figure 3:
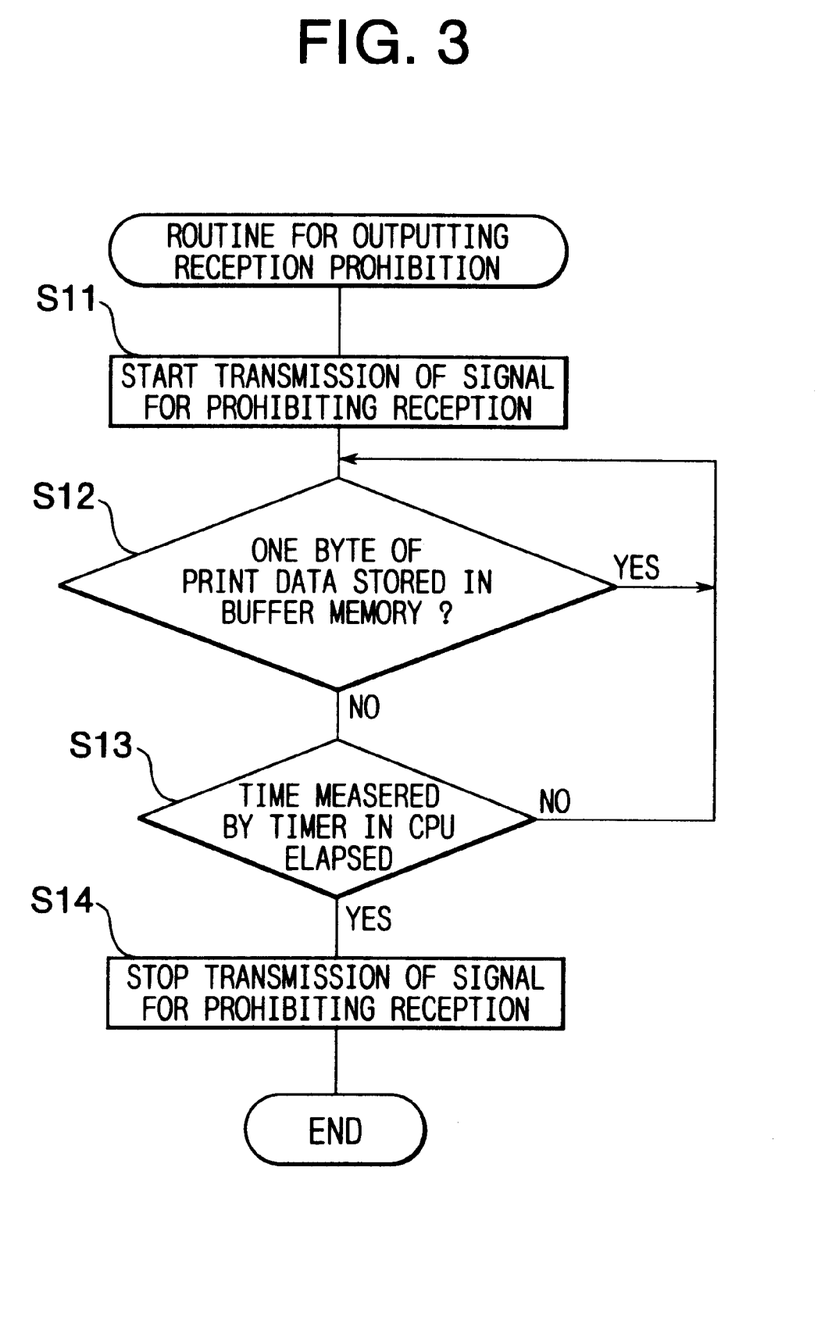
FIG. 3 is a flowchart representing a routine for outputting a reception prohibition signal performed by the multi-function peripheral device of FIG. 1.

Next, while referring to the flowchart shown in FIG. 3, an explanation will be provided for the processes performed in S3 of FIG. 2 for outputting the reception prohibition signal for prohibiting transmission of print data from the personal computer 1 to the multi-function peripheral device 2.

First in S11, the CPU 31 of the multi-function peripheral device 2 controls the interface 36 to start transmitting the reception prohibition signal to the personal computer 1. As a result, the personal computer 1 will not transmit any new print data to the multi-function peripheral device 2.

Then, in S11a, the CPU 31 starts up a timer 31a for indicating how long the reception prohibition signal is to be transmitted. The timer 31a can be configured from a decrementing counter using a register of the CPU 31. In this case, the decrementing counter is set with an optional value and the decremented in synchronization with a clock signal having a predetermined period. The clock signal is generated by a clock signal generator 37. The decrementing counter will reach zero after a predetermined duration of time, which corresponds with the set value, elapses. The value of the decrementing counter will remain at zero until the value is reset.

The CPU 31 sets the value of the timer 31a in correspondence with the transmission speed of the facsimile transmission. That is to say, when the facsimile transmission is being transmitted at a high transmission speed, then the CPU 31 will need to devote a large portion of its time to processing the facsimile data. Therefore, the value set in the timer 31a should be set to a large value so that the CPU 31 can devote enough time to process all the facsimile data without also having to devote as much time to processing the print data. On the other hand, when the facsimile transmission is performed at a slow transmission speed, then the set value can be set to a small value because the CPU 31 will not need to devote as much time to processing the facsimile data.

Next in S12, the CPU 31 determines whether or not one byte of print data is temporarily stored in the buffer memory 36a of the interface 36. If one byte of print data is not stored in the buffer memory 36a of the interface 36 (S12:NO), then the CPU 31 in S13 determines whether or not the time measured by the timer 31a started in S3 of FIG. 2 has run out.

If the time measured by the timer 31a has run out (S13:YES), then in S14, the CPU 31 controls the interface 36 to stop transmitting the reception prohibition signal to the personal computer 1 and this routine is ended.

On the other hand, if the time measured by the timer 31a started in S3 of FIG. 2 has not run out (S13:NO), then the routine returns to S12 and repeats S12 and S13 until the timer 31a runs out. In this way, the condition wherein print data is not received from the personal computer 1 is continued and the CPU 31 processes both print data and facsimile data, or facsimile data only once all the print data transmitted to the RAM 33 has been processed.

When one byte of print data is temporarily stored in the buffer memory 36a of the interface 36 (S12:YES), then the print data in the buffer memory 36a has not yet been transmitted to the RAM 33 and the buffer memory 36a has not yet been cleared. Therefore, S12 is repeatedly executed until all the print data in the buffer memory 36a has been transmitted to the RAM 33 and the buffer memory 36a is cleared.

While the invention has been described in detail with reference to specific embodiments thereof, it would be apparent to those skilled in the art that various changes and modifications may be made therein without departing from the spirit of the invention, the scope of which is defined by the attached claims.

For example, although the embodiment described the processes represented by the flowcharts in FIGS. 2 and 3 as being performed with respect to the reception of print data from the personal computer 1 to the multi-function device 2, the same processes can be performed with respect to other data, that is, besides print data, transmitted from the personal computer 1 to the multi-function device 2. For example, while a facsimile transmission is being performed, transmission of a signal for prohibiting the personal computer 1 from transmitting other types of data can be started in S11.

Also, although in the embodiment the timer is not started up when a facsimile transmission is not being performed (S2:NO), the timer 31a can be started up anyway to enable the CPU 31 time to process both the print data and also data other than facsimile data. In this case, however, it can be assumed that less time will be required to process the other type of data than facsimile data. Therefore, the timer 31a can be set to measure a time duration shorter than the time duration set during a facsimile transmission.

Figure 4:
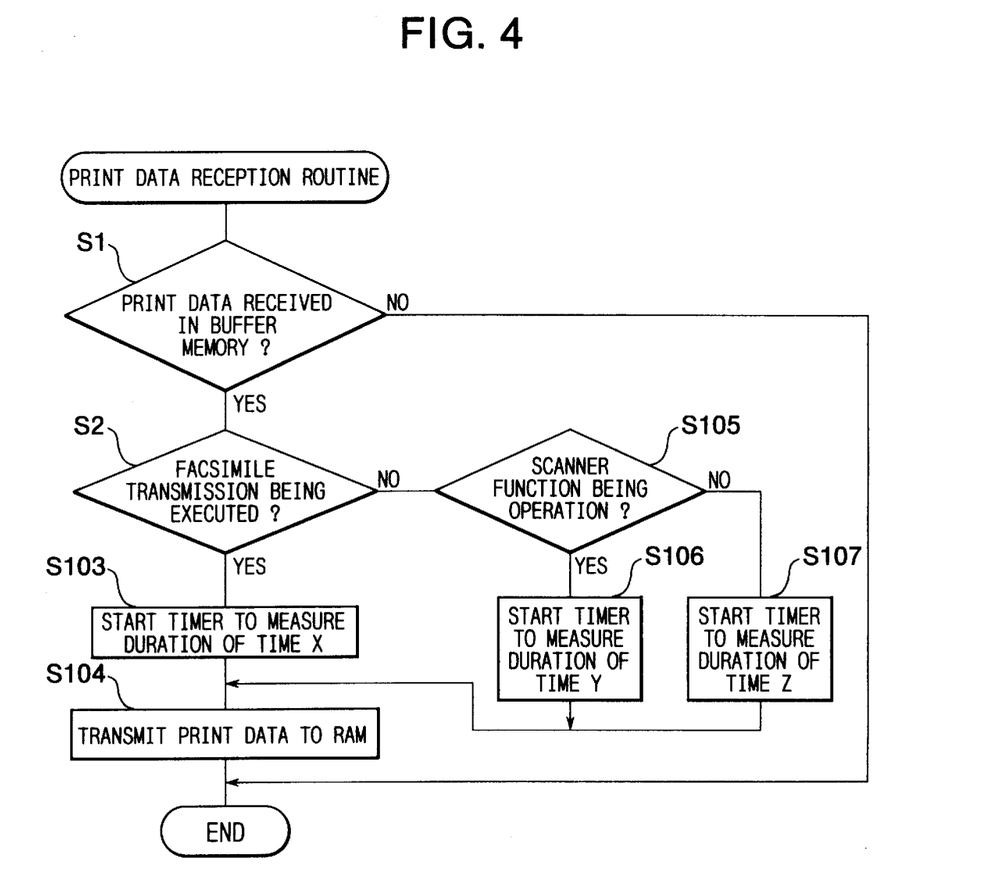
FIG. 4 is a flowchart representing a modification of the routine represented by the flowchart of FIG. 2.

This modification of the embodiment will be described in more detail while referring to the flowchart in FIG. 4. Steps for performing the same operations as shown in FIG. 3 are provided with the same numbering to avoid duplication of description. When it is determined that a facsimile transmission is being performed (S2:YES), then in S103 the routine represented by the flowchart in FIG. 3 for outputting the reception prohibition signal is performed wherein the timer is set to measure a duration of time X. Then, in S104 the print data is transmitted from the buffer memory 36a to the RAM 33.

When it is determined that a facsimile transmission is not being performed (S2:NO), then in S105 whether or not the scanner function of the multi-function device 2 is being used is determined. If so (S105:YES), then in S106 the routine represented by the flowchart in FIG. 3 for outputting the reception prohibition signal is performed wherein the timer is set to measure a duration of time Y. Because less time is required to process scanner data than facsimile data, the duration of time Y is set shorter than the duration of time X. If neither the facsimile function nor the scanner function are being performed (S105:NO), then in S107 the routine represented by the flowchart in FIG. 3 for outputting the reception prohibition signal is performed wherein the timer is set to measure a duration of time Z. The duration of time Z is shorter than either the time duration X or Y. In this way, the burden on the CPU 31 can be more precisely adjusted.

What is claimed is:

1. A multi-function peripheral device serving as a peripheral device for an information processing device and capable of simultaneously executing a plurality of functions by multi-task processing, the multi-function peripheral device comprising:
   a processor;
   a transmission/reception unit that, under the control of the processor, transmits and receives data, for performing a plurality of functions, between the multi-function peripheral device and the information processing device;
   a memory provided in the transmission/reception unit, the memory being for temporarily storing a predetermined amount of data received from the information processing device;
   a transmission unit that, under the control of the processor, transmits and receives data to and from a remote transmission device via a transmission line; and
   a reception speed control unit that determines whether the processor is simultaneously controlling the transmission/reception unit and the transmission unit to transmit or receive data and that, upon determining that the processor is simultaneously controlling the transmission/reception unit and the transmission unit, controls the processor to reduce reception speed at which the transmission/reception unit receives data from the information processing device by prohibiting the transmission/reception unit from storing the predetermined amount of data in the memory until a predetermined time has elapsed, even if the memory is capable of storing the predetermined amount of data.

2. A multi-function peripheral device as claimed in claim 1, wherein the reception speed control unit reduces the reception speed by increasing periods at which reception of data by the transmission/reception unit is prohibited.

3. A multi-function peripheral device as claimed in claim 2, wherein the reception speed control unit includes:
   a clock signal generator generating a clock signal; and
   a counter that measures the period at which reception of data by the transmission/reception unit is prohibited by counting a value set therein in synchronization with the clock signal from the clock signal generator;
   wherein the reception speed control unit increases the periods at which reception of data by the transmission/reception unit is prohibited by increasing the value set in the counter.

4. A multi-function peripheral device as claimed in claim 1, wherein the reception speed control unit reduces the reception speed in accordance with transmission speed of the transmission unit.

5. A multi-function peripheral device as claimed in claim 1, further comprising a transmission prohibition unit that prohibits the information processing device from transmitting data to the transmission/reception unit when the transmission/reception unit receives a predetermined amount of data from the information processing device, wherein the reception speed control unit controls the transmission prohibition unit to prohibit the information processing device from transmitting data to the transmission/reception unit for a duration of time that is longer when the transmission unit and the transmission/reception unit operate simultaneously than when the transmission/reception unit do not operate simultaneously.

6. A multi-function peripheral device as claimed in claim 5, wherein the reception speed control unit sets the duration of time depending on a type of operation that the transmission unit performs simultaneously with the transmission/reception unit.

7. A multi-function peripheral device as claimed in claim 5, wherein, when the transmission unit and the transmission/reception unit operate simultaneously, the reception speed control unit controls the transmission prohibition unit to set the duration of time longer when the transmission unit is transmitting facsimile data than when the transmission unit is not transmitting facsimile data.

8. A multi-function peripheral device as claimed in claim 5, wherein the reception speed control unit controls the transmission prohibition unit to set the duration of time according to a transmission speed of the transmission unit.

9. A multi-function peripheral device as claimed in claim 1, wherein the transmission/reception unit transmits and receives print data, the reception speed control unit determining that the transmission/reception unit is operating based on presence of print data.

10. A multi-function peripheral device as claimed in claim 1, wherein the transmission unit transmits and receives facsimile data, the reception speed control unit determining that the transmission unit is operating based on presence of facsimile data.

11. A multi-function peripheral device as claimed in claim 1, further comprising:
   another memory that stores data temporarily stored in the memory, data to be transmitted from the transmission unit to the remote device, and data received by the transmission unit from the remote device; and
   a transmit unit that empties the memory by transmitting the predetermined amount of data stored in the memory to the another memory, the transmit unit transmitting the predetermined amount of data to the another memory each time the predetermined amount of data is stored in the memory.

12. A multi-function peripheral device as claimed in claim 1, wherein the predetermined time is a predetermined time from when the transmission/reception unit stores data received from the information processing device in the memory.

13. A multi-function peripheral device as claimed in claim 1, wherein the reception speed control unit changes reception speed in accordance with transmission speed of the transmission unit.

14. A multi-function peripheral device as claimed in claim 11, wherein the predetermined amount of data is one byte.

15. A storage medium storing programs for controlling a multi-function peripheral device serving as a peripheral device for an information processing device and capable of simultaneously executing a plurality of functions by multi-task processing, the storage medium storing:
   a transmission/reception program that controls a transmission/reception unit, using a processor, to transmit and receive data, for performing a plurality of functions, between the multi-function peripheral device and the information processing device;

a memory provided in the transmission/reception unit, the memory being for temporarily storing a predetermined amount of data received from the information processing device;

a transmission program that controls a transmission unit, using the processor, to transmit and receive data to and from a remote transmission device via a transmission line; and a reception speed control program that determines whether the processor is simultaneously controlling the transmission/reception unit and the transmission unit to transmit or receive data and that, upon determining that the processor is simultaneously controlling the transmission/reception unit and the transmission unit, controls to reduce reception speed at which the transmission reception unit receives data from the information processing device by prohibiting the transmission/reception unit from storing the predetermined amount of data in the memory until a predetermined time has elapsed, even if the memory is capable of storing the predetermined amount of data.

16. The storage medium as claimed in claim 15, further comprising:

another memory that stores data temporarily stored in the memory, data to be transmitted from the transmission unit to the remote device, and data received by the transmission unit from the remote device; and a transmit unit that empties the memory by transmitting the predetermined amount of data stored in the memory to the another memory, the transmit unit transmitting the predetermined amount of data to the another memory each time the predetermined amount of data is stored in the memory.

17. The storage medium as claimed in claim 15, wherein the predetermined time is a predetermined time from when the transmission/reception unit stores data received from the information processing device in the memory.

18. The storage meduim as claimed in claim 16, wherein the predetermined amount of data is one byte.

19. A multi-function peripheral device serving as a peripheral device for an information processing device and capable of simultaneously executing a plurality of functions by multi-task processing, the multi-function peripheral device comprising:

a transmission/reception unit that transmits and receives data, for performing a plurality of functions, between the multi-function peripheral device and the information processing device;

a memory provided in the transmission/reception unit, the memory being for temporarily storing data received from the information processing device;

a transmission unit that transmits and receives data to and from a remote transmission device via a transmission line; and a reception speed control unit that determines whether the transmission/reception unit and the transmission unit are simultaneously transmitting or receiving data and that, upon determining that the transmission/reception unit and the transmission unit are simultaneously operating, reduces reception speed at which the transmission/reception unit receives data from the information processing device by prohibiting the transmission/reception unit from storing data from the information processing device in the memory until a predetermined time has elapsed, even if the memory is empty.

20. A multi-function peripheral device as claimed in claim 19, further comprising:

another memory that stores data temporarily stored in the memory, data to be transmitted from the transmission unit to the remote device and data received by the transmission unit from the remote device; and a transmit unit that empties the memory by transmitting the predetermined amount of data stored in the memory to the another memory, the transmit unit transmitting the predetermined amount of data to the another memory each time data is stored in the memory so that the memory is no longer empty.

21. A multi-function peripheral device as claimed in claim 19, wherein the predetermined time is a predetermined time from when the transmission/reception unit stores data received from the information processing device in the memory.

22. A multi-function peripheral device serving as a peripheral device for an information processing unit and capable of simultaneously executing a plurality of functions by multi-task processing, the multi-function peripheral device comprising:

a transmission/reception unit that transmits and receives data, for performing a plurality of functions, between the multi-function peripheral device and the information processing device;

a memory provided in the transmission/reception unit, the memory being for temporarily storing data received from the information processing device; and a transmission unit that transmits and receives data to and from a remote transmission device via a transmission line;

a judgment unit that judges whether the transmission/reception unit and the transmission unit are simultaneously transmitting and/or receiving data; and a control unit that, when the judgment unit judges that the transmission/reception unit and the transmission unit are simultaneously transmitting and/or receiving data, prohibits the transmission/reception unit from storing data from the information processing device in the memory until a predetermined time has elapsed, even if the memory is empty.

23. A multi-function peripheral device as claimed in claim 22, further comprising:

another memory that stores data temporarily stored in the memory, data to be transmitted from the transmission unit to the remote device, and data received by the transmission unit from the remote device; and a transmit unit that transmits data temporarily stored in the memory to the another memory, the transmit unit transmitting the data to the another memory each time data is stored in the memory so that the memory is no longer empty.

24. A multi-function peripheral device as claimed in claim 22, wherein the control unit, when the judgment unit judges that the transmission/reception unit and the transmission unit are simultaneously transmitting and/or receiving data, allows the transmission/reception unit to store data received from the information processing device in the another memory if the predetermined time has elapsed.

25. A multi-function peripheral device as claimed in claim 22, wherein the predetermined time is a predetermined time from when the transmission/reception unit stores data received from the information processing device in the memory.

26. A multi-function peripheral device serving as a peripheral device for an information processing unit and capable of simultaneously executing a plurality of functions by multi-task processing, the multi-function peripheral device comprising:

a transmission/reception unit that transmits and receives data, for performing a plurality of functions, between the multi-function peripheral device and the information processing device;

a memory provided in the transmission/reception unit, the memory being for temporarily storing data received from the information processing device;

a data generation unit that generates data;

a judgment unit that judges whether reception of data by the transmission/reception unit data and generation of data by the data generation unit are simultaneously occurring; and a control unit that, when the judgment unit judges that reception of data by the transmission/reception unit data and generation of data by the data generation unit are simultaneously occurring, prohibits the transmission/reception unit from storing data received from the information processing device in the memory until a predetermined time has elapsed, even if the memory is empty.

27. A multi-function peripheral device as claimed in claim 26, further comprising:

another memory that stores data temporarily stored in the memory and data generated by the data generation unit; and a transmit unit that transmits data temporarily stored in the memory to the another memory, the transmit unit transmitting the data to the another memory each time data is stored in the memory so that the memory is no longer empty.

28. A multi-function peripheral device as claimed in claim 26, wherein when the judgment unit judges that reception of data by the transmission/reception unit data and generation of data by the data generation unit are simultaneously occurring, the control unit allows the transmission/reception unit to store data received from the information processing device in the memory once the predetermined time has elapsed.

29. A multi-function peripheral device as claimed in claim 26, wherein the predetermined time is a predetermined time from when the transmission/reception unit stores data received from the information processing device in the memory.

30. A multi-function peripheral device as claimed in claim 26, further comprising a transmission unit that transmits and receives data to and from a remote transmission device via a transmission line;

wherein when the judgment unit judges that at least one of transmission of data to the remote transmission device by the transmission unit, reception of data from the remote transmission device by the transmission unit and generation of data by the data generation unit is occurring simultaneously with reception of data by the transmission/reception unit, the control unit allows the transmission/reception unit to store data received from the information processing device in the memory once the predetermined time has elapsed.

31. A multi-function peripheral device as claimed in claim 30, wherein when the judgment unit judges that at least one of transmission of data to the remote transmission device by the transmission unit and reception of data from the remote transmission device by the transmission unit is occurring simultaneously with reception of data by the transmission/reception unit, the predetermined time is a first predetermined time.

32. A multi-function peripheral device as claimed in claim 31, wherein when the judgment unit judges that at least one of transmission of data to the remote transmission device by the transmission unit and reception of data from the remote transmission device by the transmission unit is occurring simultaneously with generation of data by the data generation unit, the predetermined time is a second predetermined time shorter than the first predetermined time.

33. A multi-function peripheral device as claimed in claim 32, wherein when the judgment unit judges that at least one of transmission of data to the remote transmission device by the transmission unit, reception of data from the remote transmission device by the transmission unit, and generation of data by the data generation unit is not occurring simultaneously with reception of data by the transmission/reception unit, the predetermined time is a third predetermined time shorter than the second predetermined time.

34. A multi-function peripheral device serving as a peripheral device for an information processing unit and capable of simultaneously executing a plurality of functions by multi-task processing, the multi-function peripheral device comprising:

a processor;

a transmission/reception unit that, under the control of the processor, transmits and receives data, for performing a plurality of functions, between the multi-function peripheral device and the information processing device;

a memory provided in the transmission/reception unit, the memory being for temporarily storing a predetermined amount of data received from the information processing device;

a transmission unit that, under the control of the processor, transmits and receives data to and from a remote transmission device via a transmission line; and a reception speed control unit that determines whether the processor is simultaneously controlling the transmission/reception unit and the transmission unit to transmit or receive data and that, upon determining that the processor is simultaneously controlling the transmission/reception unit and the transmission unit, controls the processor to reduce reception speed at which the transmission/reception unit receives data from the information processing device by prohibiting transmission of data from the information processing device until a predetermined time has elapsed, even if the memory is capable of storing the predetermined amount of data.

35. A multi-function peripheral device serving as a peripheral device for an information processing unit and capable of simultaneously executing a plurality of functions by multi-task processing, the multi-function peripheral device comprising:

a transmission/reception unit that transmits and receives data, for performing a plurality of functions, between the multi-function peripheral device and the information processing device;

a memory provided in the transmission/reception unit, the memory being for temporarily storing data received from the information processing device;

a transmission unit that transmits and receives data to and from a remote transmission device via a transmission line; and a reception speed control unit that determines whether the transmission/reception unit and the transmission unit are simultaneously transmitting or receiving data and that, upon determining that the transmission/reception unit and the transmission unit are simultaneously operating, reduces reception speed at which the transmission/reception unit receives data from the information processing device by prohibiting transmission of data from the information processing device until a predetermined time has elapsed, even if the memory is empty.

* * * * *